No. 717,539. PATENTED JAN. 6, 1903.
H. C. BUHOUP & G. P. RITTER.
CAR WHEEL AND TIRE ROLLING MILL.
APPLICATION FILED SEPT. 20, 1902.
NO MODEL. 2 SHEETS—SHEET 1.

Witnesses
Inventors
Attorney

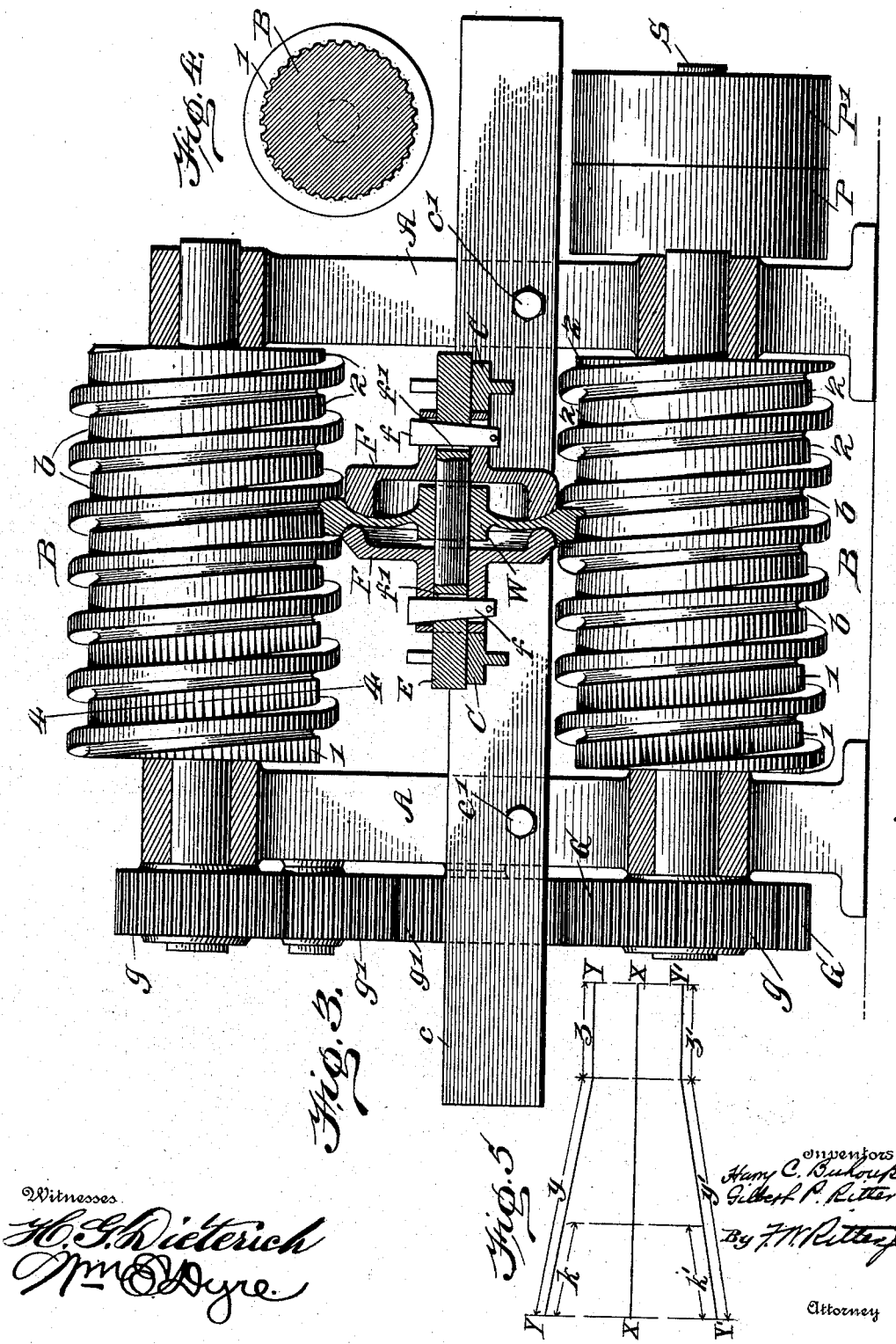

UNITED STATES PATENT OFFICE.

HARRY C. BUHOUP AND GILBERT P. RITTER, OF CHICAGO, ILLINOIS.

CAR-WHEEL AND TIRE ROLLING MILL.

SPECIFICATION forming part of Letters Patent No. 717,539, dated January 6, 1903.

Application filed September 20, 1902. Serial No. 124,247. (No model.)

*To all whom it may concern:*

Be it known that we, HARRY C. BUHOUP and GILBERT P. RITTER, citizens of the United States, residing at Chicago, in the county of Cook, State of Illinois, have invented certain new and useful Improvements in Car-Wheel and Tire Rolling Mills; and we hereby declare the following to be a full, clear, and exact description of the same, reference being had to the accompanying drawings, in which—

Figure 1:
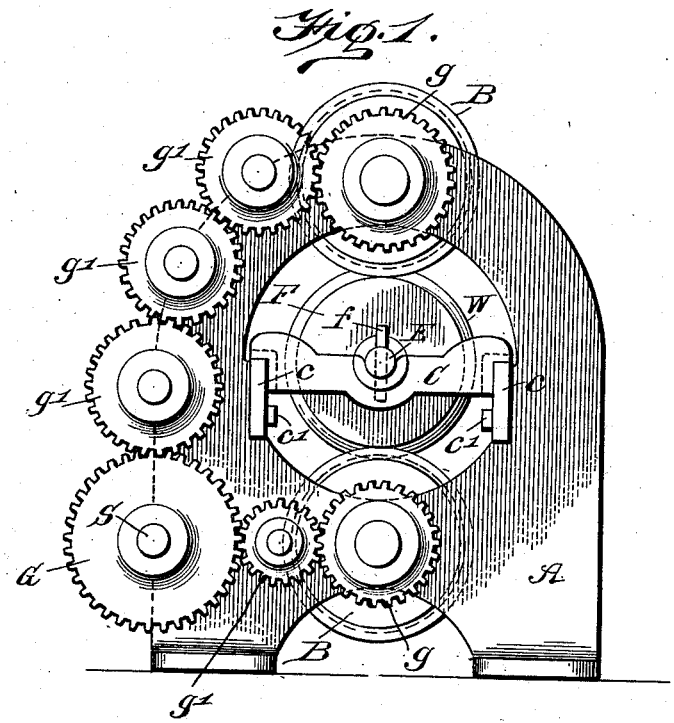
Figure 2:
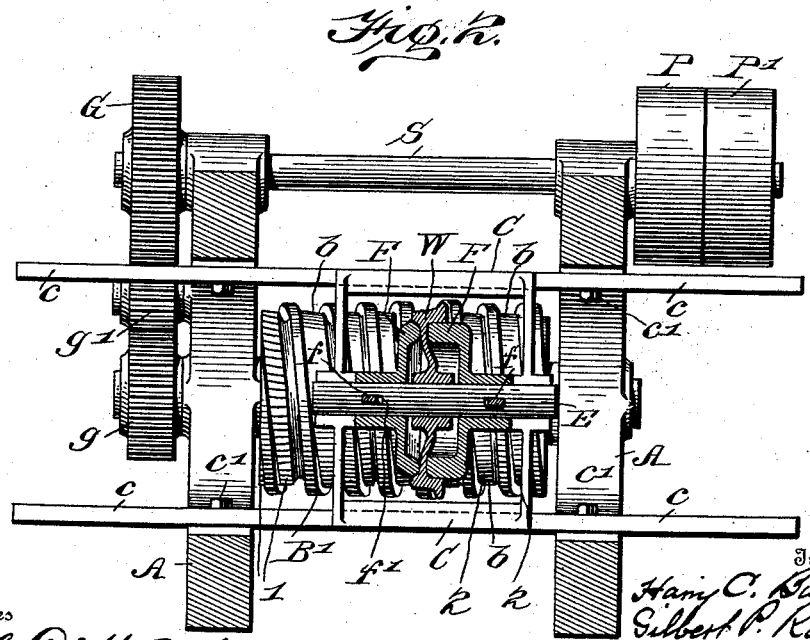

Figure 1 is an end elevation of a rolling-mill embodying our invention. Fig. 2 is a horizontal central section of the same, the clamp-carriage being in elevation. Fig. 3 is an enlarged vertical central section, the rolls being shown in elevation. Fig. 4 is a section of the spirally-grooved roll on the line 4 4, Fig. 3, showing its corrugations; and Fig. 5 is an exaggerated diagram showing the relation of the work to the successive operative positions of the groove of the roll.

Like symbols refer to like parts wherever they occur.

Our invention relates to the rolling of car-wheels, tires, or similar objects and condensing the metal in the peripheries of the same.

Generally stated, our invention may be said to embrace the combination, with a roll having a spiral groove the locus of whose operative positions converges toward the axis of the work throughout at least a portion of the length of the pass, of means for axially and revolubly supporting the work in operative contact with the roll.

We will now proceed to describe our invention more fully, so that others skilled in the art to which it appertains may apply the same either in the form shown in the drawings or in such modification as circumstances may dictate.

In the drawings, A A are cheeks or standards, in which are journaled the rolls B B and which support the roll-driving mechanism and the work-guides c c. The rolls B B are each provided with a spiral groove or pass b b, which may be of any desired contour, but in the present instance conforming generally to the outline of a car-wheel tread and flange, said spirals both pitching in the same direction—that is to say, both may be right hand or both left hand at the will of the constructor and the desired direction of feed and delivery of the work. The grooves b b are preferably corrugated transversely of the tread for a portion of their lengths at the feed end of the rolls, as at 1 1, (see Fig. 4,) the remainder of the groove being plain; but the grooves may be plain throughout their entire length, if desired. We also prefer to so form the grooves that at least a portion of the spiral about each roll at the delivery end thereof equal to the periphery of the blank, as at 2 2, is of uniform depth, the remaining portion of said grooves gradually and slightly deepening to the opposite or feed end of the rolls, where the work or blank is introduced; but the relative lengths of spiral of uniform and gradually-increasing depth may be varied or the portion of uniform depth omitted, if desired. In lieu of forming the grooves of variable depth the axes of said rolls may converge.

The work or blank W is mounted on a mandrel E between clamp members F F, which are forced together and secured to said mandrel by keys $ff$, passing through slots $f'f'$ in the mandrel or in other suitable manner.

C is a work or blank clamp-carriage, in which is journaled the mandrel E, and said carriage is guided in a line parallel to the axes of the rolls by the track or work guides c c, which are secured to the cheeks or standards A A by bolts $c' c'$.

The rolls B B are each provided with gear-wheels $g\ g$, which are driven in union and in the same direction from the driving-gear G through pinions $g'\ g'$, which are journaled in the roll-housing or standards A A.

P and P' are respectively a fixed and loose pulley journaled upon the shaft S, at the opposite end of which is fixed the gear-wheel G, which, through the pinions $g'\ g'$, causes the rotation of the rolls, as before noted. A belt (not shown) passes around the pulley P', and when it is desired to operate the mill said belt is shifted to the fixed pulley P, thus applying the power; but the rolls may be positively driven, if desired.

Referring to the diagram Fig. 5, X X represent the length of pass and the line of delivery or axis of the work and Y Y Y' Y' represent the loci of successive working positions of the spiral grooves from feed to delivery of the work, said loci Y Y and Y' Y' in part ($y$ and $y'$) approaching the line of delivery or axis of the work X X and in part ($z$ and $z'$) being parallel thereto. The corrugated portions of the spiral grooves are represented as $k$ $k'$.

The construction being substantially such as herein pointed out the operation will be as follows: The wheel-blank W, which may be a cast blank of slightly greater diameter than the finished wheel, is placed upon the mandrel E of the carriage C and secured thereto by the clamps F F and keys $ff$ and while at a rolling heat is guided by the track $c$ $c$ between the rolls, which are being driven in the same direction through the agency of the power-pulley P. The spiral grooves of the rolls, both pitching in the same direction and being relatively set to receive the blank at the same instant, receive the blank and feed it forward across the corrugated shallowing portion of the grooves, thus corrugating and condensing the periphery of the blank, thence along the plain portion of decreasing depth, thus further condensing the tread, and finally along the plain portion of the groove or pass which is of uniform depth, thus finishing the wheel with a perfectly circular periphery and delivering said finished blank and work-carriage upon the track-guides $c$ $c$ in a line parallel to the axes of the rolls.

It will be noted that the blank W revolves upon the mandrel E as the work advances toward the delivery end of the rolls, thus presenting to the rolls successively adjacent portions of the periphery of the blank to the operation of the rolls; but it is evident that the same result would be accomplished by revolving the rolls about the mandrel E as axis. In either event there is a relative concentric rotation of the work or blank and the axes of the rolls about the mandrel E as center.

Having thus described our invention, what we claim as new, and desire to secure by Letters Patent, is—

1. In a rolling-mill, the combination with a roll having a spiral groove or pass therein, of means independent thereof for revolubly supporting the work at its axis in operative contact therewith, substantially as and for the purposes specified.

2. In a rolling-mill, the combination with a spirally-grooved roll, said roll being relatively movable with respect to said work in a direction parallel to its axis, of means independent thereof for supporting the work at its axis in operative contact with said roll, substantially as and for the purposes specified.

3. In a rolling-mill, the combination with a spirally-grooved roll, of traveling clamp members for confining the work, and means for presenting successively adjacent elements of the periphery of the work to the spirally-grooved roll, substantially as and for the purposes specified.

4. In a rolling-mill for circular blanks, the combination of rolls having fixed axes and which deliver in a plane parallel to and intermediate of their axes, and traveling clamp members for confining the blank, substantially as and for the purposes specified.

5. In a rolling-mill, the combination with a spirally-grooved roll, of traveling clamp members for confining the work, and means for supporting the work in operative contact with said roll, substantially as and for the purposes specified.

6. In a rolling-mill, the combination with a spirally-grooved roll, of means for revolubly supporting the work at its axis and permitting a travel of said work throughout the operative length of the roll, substantially as and for the purposes specified.

7. In a rolling-mill, the combination with a roll having a spiral groove or pass therein, said spiral groove being corrugated throughout a portion of its length and smooth throughout the remaining portion of its length, the locus of the operative positions of said spiral groove converging toward the axis of the work throughout a portion of the length of the pass and being thence parallel to said axis of said work throughout the remaining portion of the pass, and means for supporting the work, substantially as and for the purposes specified.

8. In a rolling-mill, the combination with a work-support, of a spirally-grooved roll, said spiral groove being of variable depth throughout a portion of its length and of uniform depth throughout a portion of its length, substantially as and for the purposes specified.

9. In a rolling-mill, the combination of a roll having a spiral groove therein, and a work-carrier movable in a plane parallel to the axis of the roll, substantially as and for the purposes specified.

10. In a rolling-mill, the combination with means for supporting the work at its axis and in operative contact with the roll, of a spirally-grooved roll the locus of whose successive working faces approaches the axis of the work throughout at least a portion of its length, substantially as and for the purposes specified.

11. In a rolling-mill, the combination with a roll having a spiral groove the locus of whose operative positions converges toward the axis of the work throughout a portion of the length of the pass and is thence parallel to said axis of said work throughout the remaining portion of the pass, and means for supporting said work, substantially as and for the purposes specified.

12. In a rolling-mill, the combination with a roll having a spiral groove therein, of a traveling work-carrier movable in the direction of length of said roll, substantially as and for the purposes specified.

In testimony whereof we affix our signatures, in presence of two witnesses, this 13th day of September, 1902.

HARRY C. BUHOUP.
    GILBERT P. RITTER.

Witnesses:
 EDWIN S. CLARKSON,
 JNO. Q. ADAMS.